United States Patent [19]
Knapp et al.

[11] Patent Number: 4,660,586
[45] Date of Patent: Apr. 28, 1987

[54] LIQUID LEVEL CONTROL

[75] Inventors: David J. Knapp, Monroeville; Marion D. Waltz, Fawn Township, Allegheny County, both of Pa.; David W. Clarke, Headington, England

[73] Assignee: Aluminum Company of America, Pittsburgh, Pa.

[21] Appl. No.: 684,619

[22] Filed: Dec. 21, 1984

[51] Int. Cl.⁴ .............................................. F16K 31/04
[52] U.S. Cl. ........................................ 137/2; 137/386; 137/392; 222/56; 340/620; 364/509; 251/129.05
[58] Field of Search ........................... 137/2, 386, 392; 222/56, 597, 602, 604; 73/304 R; 340/620; 364/509; 361/178; 307/118; 251/129.04, 129.05

[56] References Cited

U.S. PATENT DOCUMENTS

| | | | |
|---|---|---|---|
| 2,612,180 | 9/1952 | Schwarzkopf | 137/392 |
| 2,804,665 | 9/1957 | Harter et al. | 222/594 |
| 2,997,205 | 8/1961 | Schuerger et al. | 222/56 |
| 3,268,117 | 8/1966 | Lenkey | 222/56 |
| 3,329,313 | 7/1967 | Mayer | 222/56 |
| 3,373,910 | 3/1968 | Murton | 222/602 |
| 3,439,759 | 4/1969 | Ronanet et al. | 222/56 |
| 3,671,142 | 6/1972 | Calabrese | 137/392 |
| 3,730,695 | 5/1973 | Varrasso | 340/620 |
| 4,244,385 | 1/1981 | Hotine | 364/509 |
| 4,265,262 | 5/1981 | Hotine | 137/392 |
| 4,416,153 | 11/1983 | Williams | 364/509 |
| 4,513,616 | 4/1985 | Bezard et al. | 364/509 |

FOREIGN PATENT DOCUMENTS 1508955  7/1976  Fed. Rep. of Germany.

Primary Examiner—A. Michael Chambers
Assistant Examiner—John C. Fox
Attorney, Agent, or Firm—Daniel A. Sullivan, Jr.

[57] ABSTRACT

An apparatus for controlling liquid level, comprising containment means for containing and dispensing liquid, flow varying means operable for varying flow of liquid into the containment means, stepper motor means for operating the flow varying means, sensor means for sensing level of liquid in the containment means, and PDD controller means connected between the sensor means and the stepper motor means for controlling liquid level.

4 Claims, 3 Drawing Figures

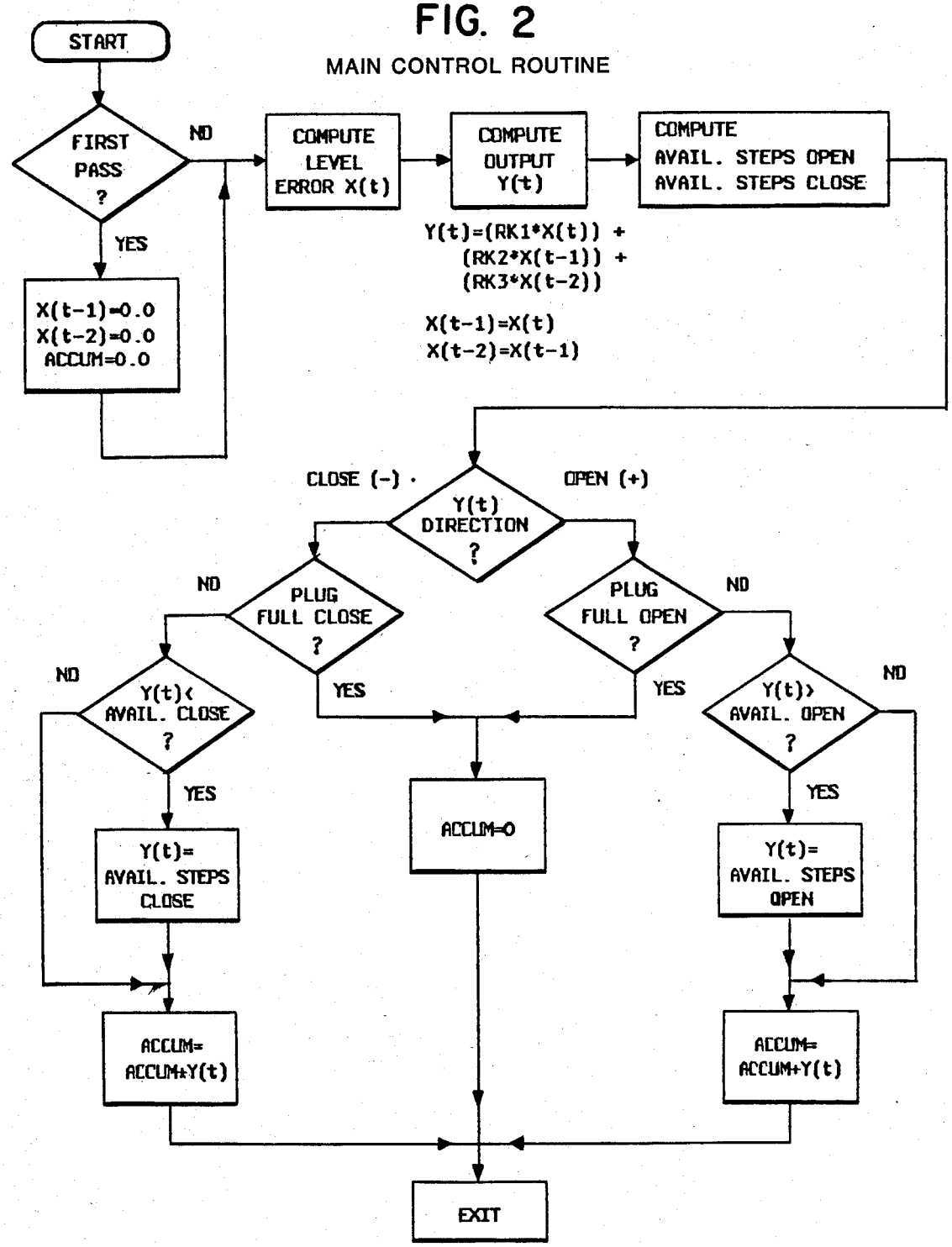

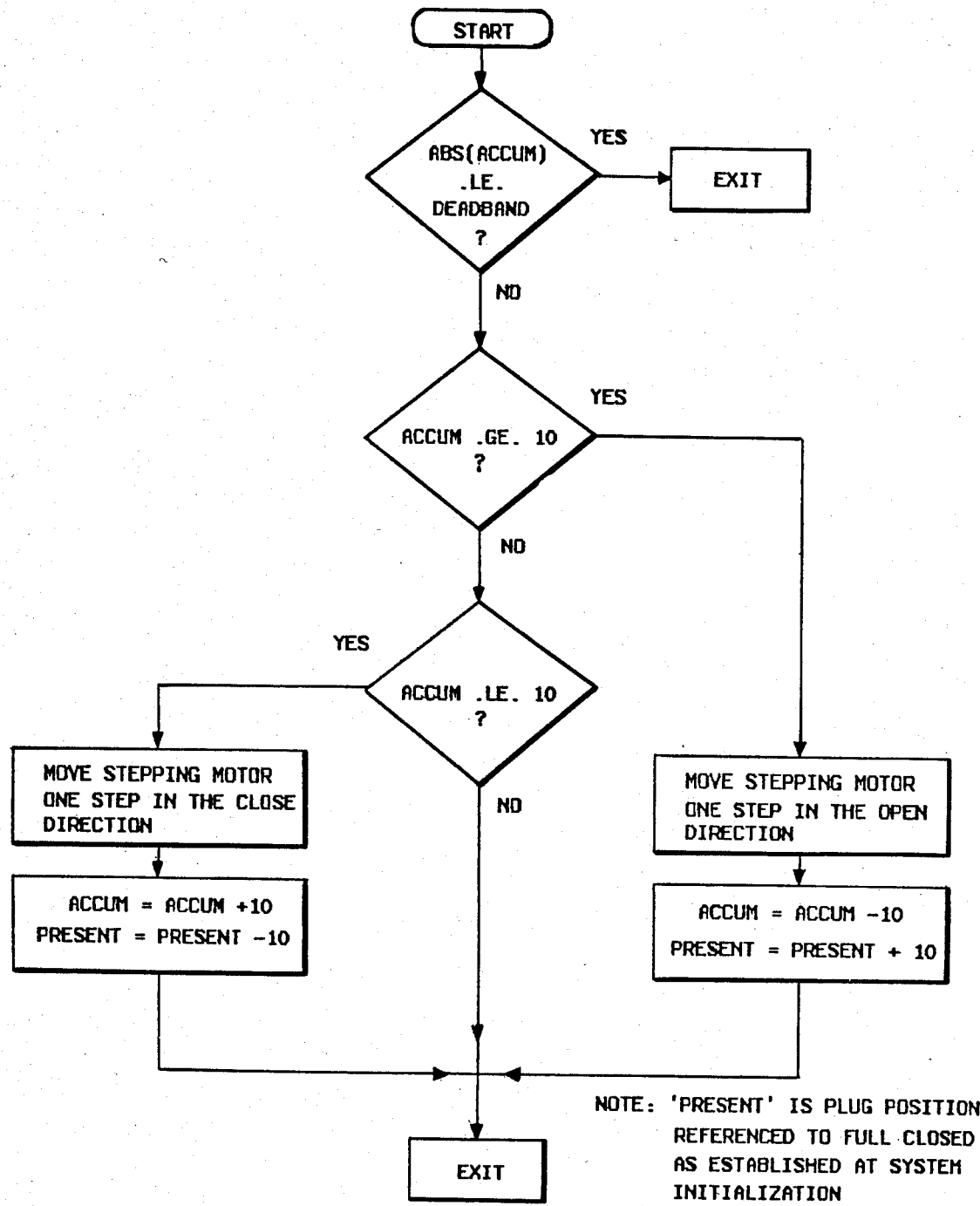

LIQUID LEVEL CONTROL

SUMMARY OF THE INVENTION

It is an object of the invention to provide an improved control of liquid level.

This as well as other objects which will become apparent from the discussion that follows are achieved, according to the present invention, by providing an apparatus for controlling liquid level, including containment means for containing and dispensing liquid, flow varying means operable for varying flow of liquid into the containment means, stepper motor means for operating the flow varying means, sensor means for sensing level of liquid in the containment means, and PDD controller means connected between the sensor means and the stepper motor means for controlling liquid level. A corresponding method is likewise provided.

BRIEF DESCRIPTION OF THE DRAWINGS

FIGS. 2 and 3 are computer program flow diagrams.

DESCRIPTION OF THE PREFERRED EMBODIMENTS

Figure 1:
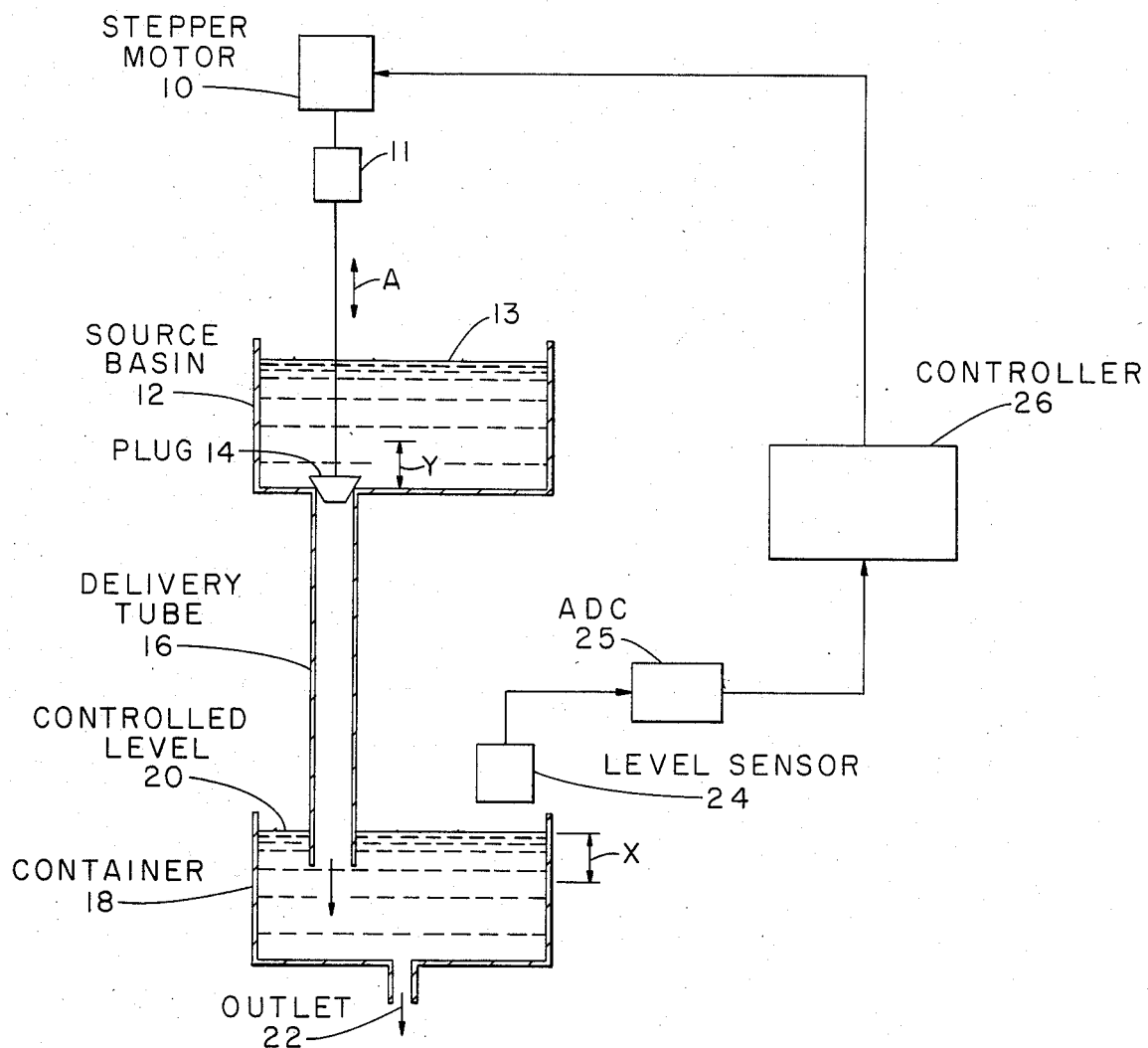
FIG. 1 is a schematic representation of the apparatus of the invention.

With reference to FIG. 1, stepper motor 10 is arranged by source basin 12 holding a supply 13 of liquid. Stepper motor 10, also referred to as a stepping motor, has a suitable mechanical transmission 11 to move plug 14 in the line of arrow A into and out of a corresponding valve seat for causing liquid to flow into delivery tube 16 at rates varying with the amount of displacement of plug 14 out of contact with the valve seat.

A suitable transmission is of the type shown in FIG. 6 of U.S. Pat. No. 2,804,665.

It will be recognized, of course, that other means of varying flow are possible. The stepper motor can, as well, operate an orifice-varying diaphragm. Or it can operate a cam to push against a flexible siphon tube to constrict, or open, the tube for flow variation. Another possibility would be to arrange the stepper motor to vary fuel, or electricity, to a pump bringing liquid to container 18.

In a preferred embodiment, container 18 is a containment in which a constant static head of liquid is required. It may, for instance, be the mold of an electromagnetic caster, or the tundish of a roll caster, where a constant static head is of advantage for obtaining uniform solid product in the continuous casting of molten metal.

The level to which liquid in container 18 is controlled is indicated by controlled level 20. The liquid is dispensed from container 18 through outlet 22. Alternatively, it may be dispensed to a liquid-solid interface, as in continuous casting of metal.

Level sensor 24 may be of the type including one or more inductive coils and referred to as an eddy current sensing device. Its output signal changes as a function of the distance between it and the liquid level when the liquid is metal, such as molten aluminum.

Other level sensors are possible, such as those using radioactive material emitting gamma rays, those sensing heat radiation from hot metal, those relying on electrical resistance changes, etc.

Analog to digital converter (ADC) 25 outputs to controller 26 digital signals representative of the analog signals from the sensor 24.

Controller 26, which may, for instance, be a digital microcomputer, emits pulses to move stepper motor 10. A stepper motor translator may be interposed between the stepper motor and the controller to assure, for example, that the motor movement is in the correct direction. The bus from the controller will typically have several conductors to carry signals determining direction of motor movement and the amount of movement. Serial transmission may as well be used.

According to the invention, a PDD-type control is utilized to control liquid level 20. Controller 26 is provided with a setpoint, representative of level 20 in FIG. 1. The signal from level sensor 24 is compared with the setpoint and the difference noted as the error. In FIG. 1, the error is the distance X out of level 20. Distance X may be positive or negative.

The term "PDD" is short for "proportional-derivative-derivative". This type of control is characterized by adjustment of the controlling parameter, in this case position Y of the plug 14, in direct proportion to the error X, as well as in dependence on the first time derivative of X and on the second time derivative.

The equation utilized in the computer program in the microcomputer embodiment of the controller is $$Y(t) = (RK1 * X(t)) + (RK2 * X(t-1)) + (RK3 * X(t-2))$$

where
$RK1 = C1 * (C2 + (1.0 + C2 * C3)/TD + C3/TD**2)$
$RK2 = (-C1/TD) * (1.0 + C2 * C3 + 2.0 * C3/TD)$
$RK3 = C1 * C3/TD**2$.

In these equations, "*" signifies multiplication, "/" division, and "**" means "raised to the power of".

Error measurements are made every TD seconds, for instance every 0.1 second, and placed in a stack of three memory locations. X(t) contains the present error, X(t−1) the error measured 0.1 second ago, and X(t−2) the error from 0.2 second ago.

Typical values for C1, C2 and C3 are 0.85, 6.67 and 0.10. Values of C1, C2 and C3 for a given control situation can be determined by methods known to those skilled in the art, one such method being that referred to as "root locus pole placement".

The above equation utilized in the computer program was derived by us on the basis of the following considerations:

Having decided that we wanted PDD-type control, we set $$Y(s)/X(s) = C1 * (s + C2) * (1 + s * C3).$$

where "s" is the Laplace operator. This leads to $$Y(s)/X(s) = C1 * (C3 * s^2 + (1. + C2*C3)*s + C2)$$
$$= C1*C3*s**2 + C1*(1 + C2*C3)*s + C1*C2$$

Expressing this in the Z domain, $Y(Z)/X(Z) = Y(s)/X(s)$ evaluated for $s = (1 - Z**(-1))/TD$, giving $Y(Z)/X(Z) = (C1*C3/TD**2)*(1 - Z(-1))2 +$ $(C1/TD)*(1 + C2*C3)*(1 - Z(-1)) +$ Expanding the term $(1-Z^{}(-1))^2$ and consolidating gives $$Y(Z)/X(Z) = (C1^*C3/TD^{**}2 + C1(1 + C2^*C3)/TD +$$
$$C1^*C2) + ((-2^*C1^*C3/TD^{**}2) -$$
$$C1^*(1 + C2^*C3)/TD)^*Z^{**}(-1) +$$
$$(C1^*C3/TD^{**}2)^*Z^{**}(-2).$$

And, this leads to the above formula for Y(t) for use in the microcomputer program.

FIGS. 2 and 3 are flow diagrams for the computer programs implementing the control equation for Y(t) as given above.

In the "compute level error" operation, input from the level sensor is subtracted from the setpoint to determine error X(t) in inches, X being distance as shown in FIG. 1. This is the X value at the present time "t".

The next operation involves calculating Y(t) via the control equation. Y(t) is computed always as an integer, each increment representing one-tenth of one stepper motor step. The end part of this operation includes transferring X(t−1) into the storage location for X(t−2) and X(t) into the location for X(t−1), in preparation for the next pass through the flow chart, 0.1 second (100 msec) later.

The following operation compares the present valve plug position (PRESENT from FIG. 3) to the plug closed position and the plug open position to compute available steps in the open and close directions. Increments here likewise correspond to one-tenth of one motor step. The plug closed position may be stored in the controller as a zero value established at system initialization. One way of doing this is to adjust the linkage between the plug and the motor shaft such that a notch in the shaft is aligned with a magnetic sensor when the plug is closed, i.e. seated in the valve seat. The resulting signal from the magnetic sensor causes the zero value to be stored in the controller. The fully open plug position is stored as an appropriately large integer such that further plug opening has little effect toward increasing liquid flow. The angular difference in motor shaft position between open and close will typically be less than 360°, an example being 180°.

The calculated Y(t) is then subjected to analysis, as shown in the remainder of FIG. 2, to obtain an updated ACCUM for evaluation in the stepper handler routine in FIG. 3.

The main control routine of FIG. 2 is, for example, repeated every 0.1 second, while the routine of FIG. 3 repeats every 0.0125 second, for a stepper motor requiring 0.010 second for each step.

The stepper handler routine of FIG. 3 evaluates ACCUM and outputs one motor step whenever the absolute value of ACCUM is greater than 10. The present location of the plug relative to its closed position is computed as PRESENT. DEADBAND is typically zero, but is provided so that a deadband can be used if desired.

Tests using the control of the invention for level control in continuous casting of metal show ability to control level to within 0.005 inch of set point reference.

Accumulation of fractional stepper motor steps leads to a tighter, more accurate control than would be the case if, for instance, values of Y(t) less than one step were discarded.

A further advantage of the invention is that a sensor is not needed for present plug position.

While the invention has been described in terms of preferred embodiments, the claims appended hereto are intended to encompass all embodiments which fall within the spirit of the invention.

What is claimed is:

1. An apparatus for controlling liquid level, comprising containment means for containing and dispensing liquid, flow varying means operable for varying flow of liquid into the containment means, stepper motor means for operating the flow varying means, sensor means for sensing level of liquid in the containment means, and PDD controller means connected between the sensor means and the stepper motor means for controlling liquid level.

2. An apparatus as claimed in claim 1, the PDD controller means functioning according to $$Y(t)=(RK1^*X(t))+(RK2^*X(t-1))+(RK3^*X(t-2))$$

where
$RK1=C1^*(C2+(1.0+C2^*C3)/TD+C3/TD^{**}2)$
$RK2=(-C1/TD)^*(1.0+C2^*C3+2.0^*C3/TD)$
$RK3=C1^*C3/TD^{**}2.$ 3. An apparatus as claimed in claim 2, wherein fractional motor steps are accumulated and steps are executed upon attainment of a whole step.

4. A method for controlling level of a liquid being dispensed from a containment comprising sensing the liquid level, comparing the sensed level to a setpoint for determining error, and varying flow of replenishment liquid into the containment by a stepper motor, the steps of stepper motor movement being the sum of a term proportional to the error itself, a term proportional to the first time derivative of the error and a term proportional to the second time derivative of the error.

* * * * *